(12) United States Patent
Velusamy et al.

(10) Patent No.: US 9,654,650 B1
(45) Date of Patent: May 16, 2017

(54) DATA QUOTAS BASED ON ONLINE CHARGING SERVER LOAD

(71) Applicant: Sprint Communications Company L.P., Overland Park, KS (US)

(72) Inventors: Saravana Velusamy, Olathe, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 97 days.

(21) Appl. No.: 14/197,577

(22) Filed: Mar. 5, 2014

(51) Int. Cl.
*H04L 12/14* (2006.01)
*H04M 15/00* (2006.01)
*H04L 12/24* (2006.01)
*H04L 12/911* (2013.01)

(52) U.S. Cl.
CPC ........ *H04M 15/88* (2013.01); *H04L 12/1485* (2013.01); *H04M 15/60* (2013.01); *H04L 41/5022* (2013.01); *H04L 47/70* (2013.01)

(58) Field of Classification Search
CPC ............. H04L 12/1435; H04L 12/1407; H04L 12/1485; H04L 12/1428; H04L 12/1439; H04L 12/1453; H04L 41/5022; H04L 47/70; H04L 12/1432; H04W 4/24
See application file for complete search history.

(56) References Cited

U.S. PATENT DOCUMENTS

| 8,402,051 B2 * | 3/2013 | Ryan ..................... G06F 3/0608 707/770 |
| --- | --- | --- |
| 2008/0235005 A1 * | 9/2008 | Golan ................... H04L 67/306 704/9 |
| 2013/0148498 A1 * | 6/2013 | Kean ................... H04L 41/0893 370/230 |
| 2013/0148668 A1 * | 6/2013 | Kean ................... H04L 12/1435 370/401 |
| 2013/0176908 A1 * | 7/2013 | Baniel ................. H04L 12/1407 370/259 |
| 2013/0188483 A1 | 7/2013 | Teepell et al. |
| 2013/0315230 A1 * | 11/2013 | Li ........................... H04L 12/14 370/352 |
| 2014/0187199 A1 * | 7/2014 | Yan ........................ H04W 48/02 455/410 |
| 2015/0004928 A1 * | 1/2015 | Bejerano ............. H04M 15/781 455/405 |
| 2015/0038111 A1 * | 2/2015 | Lopez Nieto ........... H04W 4/24 455/406 |

* cited by examiner

*Primary Examiner* — Raj Jain

(57) ABSTRACT

Examples disclosed herein provide systems, methods, and software for providing data quotas based a quota query load. In one example, a method of operating a communication system includes transferring a quota request for a wireless communication device from a packet data network gateway to an online charging server. The method further includes, in the online charging server, receiving the request, identifying a data quota based on a quota query load, and transferring the data quota to the packet data network gateway to be implemented for the wireless communication device.

19 Claims, 4 Drawing Sheets

DATA QUOTAS BASED ON ONLINE CHARGING SERVER LOAD

TECHNICAL BACKGROUND

Wireless communication systems typically include wireless access systems with equipment such as wireless access nodes, along with various control and routing nodes that provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless devices, service providers, and other end user devices. The user communications typically include voice calls, data exchanges, web pages, streaming media, or text messages, among other communication services.

In some examples, an online charging server or OCS may monitor the data connections for the wireless devices. The OCS is a system that allows communication service providers to charge their customers, in real time, based on service usage. To accomplish this task, the wireless communication must be consistently monitored using data quotas to ensure that the user is permitted to use the requested amount of data. If the user is out of data, then the OCS can be used to terminate the communication and prevent the device from joining the network.

OVERVIEW

Examples disclosed herein provide systems, methods, and software for providing data quotas based a quota query load. In one example, a method for operating a communication system includes, in a packet data network gateway, identifying a communication request for a wireless communication device and, responsive to the communication request, transferring a quota request for the wireless communication device to an online charging server. The method further includes, in the online charging server, receiving the quota request, identifying a data quota for the wireless communication device based on a quota query load, and transferring the data quota to the packet data network gateway. The method also provides in the packet data network gateway, receiving the data quota for the wireless communication device.

In another example, a system for providing dynamic data quotas includes a packet data network gateway configured to identify a communication request for a wireless communication device, transfer a quota request for the wireless communication device to an online charging server, and receive a data quota for the wireless communication device from the online charging server. The system further provides the online charging server configured to receive the quota request, identify the data quota for the wireless communication device based on a quota query load, and transfer the data quota to the packet data network gateway.

In a further instance, a method of operating an online charging server to provide dynamic data quotas includes identifying a quota query load. The method also provides, for a given quota request received from a packet data network gateway, identifying a data quota based on the quota query load, and transferring the data quota to the packet data network gateway.

BRIEF DESCRIPTION OF THE DRAWINGS

Many aspects of the disclosure can be better understood with reference to the following drawings. The components in the drawings are not necessarily to scale, emphasis instead being placed upon illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Wireless devices provide a variety of applications to users that require data communications using wireless networks. These applications may include voice applications, email applications, gaming applications, file sharing applications, or a variety of other applications. When a communication is required, the wireless device may communicate with a wireless access node that will in turn communicate to a packet data network gateway or PGW. Once the requested communication is identified, the PGW may request an online charging server (OCS) for a data quota for the user device.

In some examples, the PGW will periodically query the online charging server for quota information. During these queries, the online charging server returns that an identified amount of data still remains on the user account. Once the device exhausts this quota, the PGW may again query the charging server for another quota. This process may repeat as many times as necessary until the communication is completed, or the user device exhausts the allotted amount of data in the charging server.

In the present example, a wireless communication device may require a data communication using the PGW. Once the data communication request is identified, the PGW is configured to transfer a quota request to the online charging server. In response to this request, the online charging server is configured to identify a data quota for the wireless communication device based on a quota query load, and transfer the data quota to the PGW. This data quota comprises a portion of total data available to the wireless communication device and may specify a period of time for which the portion must be used. For example, the device may have one gigabyte of total data available, but the quota may only comprise a fraction or segment of the one gigabyte. Further, in the present instance, the portion or amount of total data that is provided for the wireless communication device is based on the quota query load, or the number of quota requests that are received by the online charging server for a segment of time. For instance, if the OCS is receiving a large amount of quota requests, the OCS may become overloaded and have difficulty responding to all of the requests. In response, the OCS may provide larger data quotas for the wireless communication devices to increase the time period between quota requests. Further, in some examples, the OCS may increase the period of time for which the data quota may be used allowing a communication to occur with fewer quota requests between the PGW and the OCS.

Figure 1:
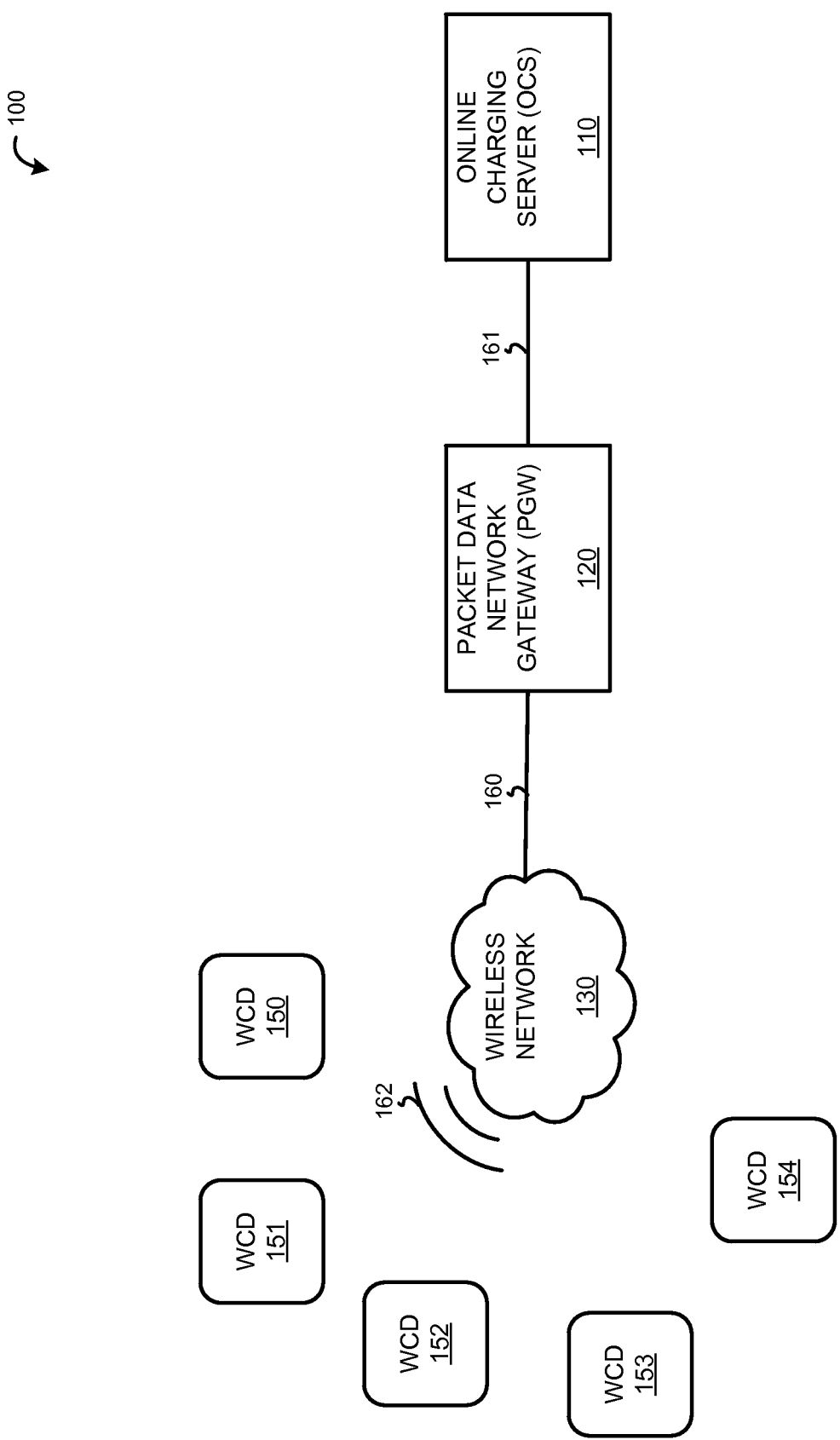
FIG. 1 illustrates a communication system for dynamically adjusting data quota sizes.

Turning to FIG. 1, FIG. 1 illustrates a communication system 100, for dynamically adjusting data quota size based on quota query load. Communication system 100 includes online charging server (OCS) 110, packet data network gateway (PGW) 120, wireless network 130, and wireless communication devices 150-154. PGW 120 communicates with OCS 110 over communication link 161, and further communicates with wireless network 130 over communication link 160. WCDs 150-154 communicate with wireless network 130 over wireless sector 162.

In operation, WCDs 150-154 may include a variety of applications or processes that require data communications over wireless network 130. These applications and processes may include voice applications, email applications, file-sharing applications, news applications, or any other similar application or process. Once a communication is requested, PGW 120 is configured to act as the interface between wireless network 130 and other packet data networks, such as the Internet or SIP-based IMS networks. To facilitate a communication, PGW 120 must first ensure that the wireless communication device has available resources to make the communication. In the present example, to determine permissions for the wireless communication device, PGW 120 is configured to communicate with OCS 110 over a Gy interface.

OCS 110 is configured to identify data quotas for the wireless communication devices and return them to PGW 120 to be implemented. In some instances, OCS 110 may include a total data available value for each of the wireless devices, such as one gigabyte or any other value of data. Once queried by PGW 120 to determine if data is available for a wireless communication device, OCS 110 is configured to identify a portion of this total data available and provide this portion to PGW 120 as a data quota. This quota may define an amount of data that is available to the wireless communication device, and may also define a period of time for which the data can be used.

Figure 2:
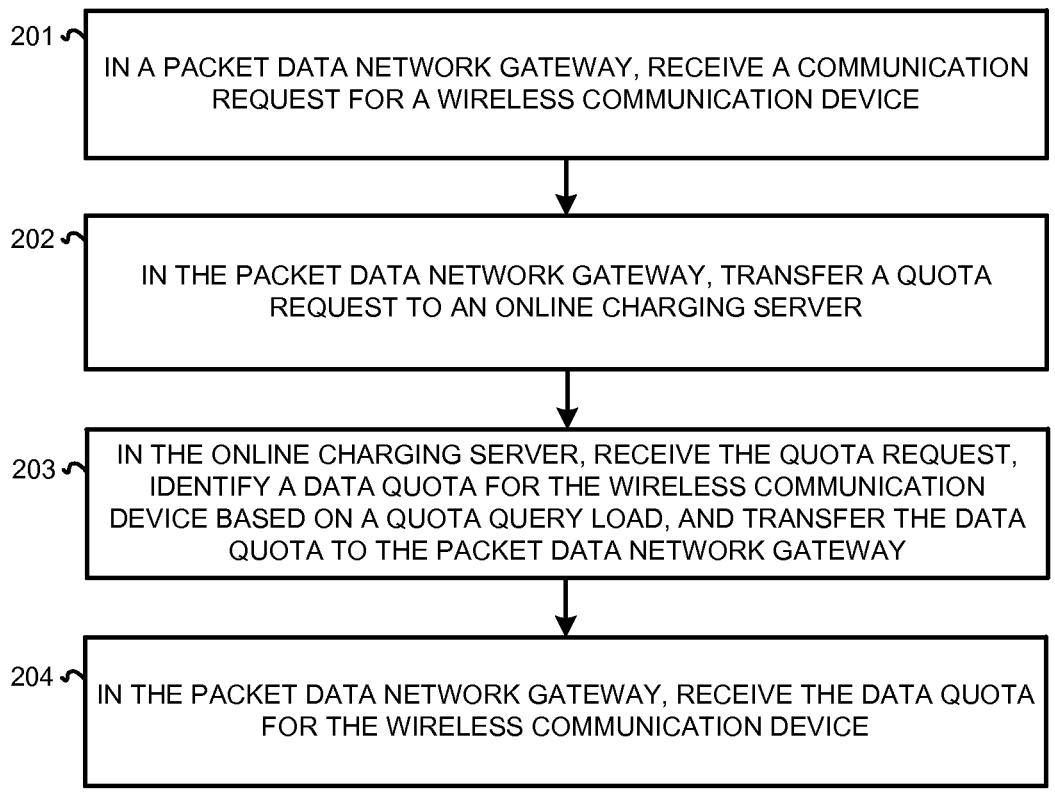
FIG. 2 illustrates a flow chart for operating a communication system to dynamically adjust data quota sizes.

To further illustrate the operation of the elements in communication system 100, FIG. 2 is provided. FIG. 2 illustrates a flow diagram describing the operation of communication system 100 according to once example. As demonstrated in FIG. 2, PGW 120 is configured to receive a communication request for a wireless communication device (201). Once received, PGW 120 is configured to transfer a quota request to online charging server 110 for the connecting wireless communication device (202). This quota request is used by PGW 120 to determine if the wireless communication device has data permissions to complete the communication.

Upon transfer of the quota request, online charging server 110 is configured to receive the request, identify a data quota for the wireless communication device based on a quota query load, and transfer the data quota to the packet data network gateway (203). The data quota is a portion or segment of the total data available for the wireless communication device that may be specified for use over a certain period of time. For instance, the wireless device may have one gigabyte of total data available, but the data quota may represent only a small portion of this total data. In the present example, this data quota identified by OCS 110 is identified based on a quota query load, or the amount of quota queries processed by OCS 110 over a segment of time.

Typically, when a packet data network gateway requests data quotas from an online charging server, the queries must be repeated as many times as necessary to complete a communication. For example, if a data communication were ten megabytes, but each data quota were one megabyte, the packet data network gateway would need to send ten data queries to complete the communication.

In the present instance, the size of the data quotas is configured to be dynamic to reduce the strain on the online charging server. As a result, if the online charging server is receiving a large amount of quota queries over a segment of time, the online charging server may identify that it has a high quota query load. Once the high load is identified, the online charging server may increase the amount of data or period of time allotted for the data quotas to reduce the number of times that the PGW needs to request quotas.

In contrast, if the number of quota queries is lower for a segment of time, then the online charging server may identify a low or small quota query load. Accordingly, the online charging server may identify smaller amounts of data or smaller periods of time for the data quotas. By monitoring the quota query load, the online charging server is capable of adjusting quotas to limit the number of future requests to the online charging server.

Once online charging server 110 transfers the data quota, PGW 120 is configured to receive the data quota and implement the data quota for the wireless communication device (204). Responsive to implementing the quota, the wireless device may initiate the requested communication. Further, in some examples, if the data quota supplied by online charging server 110 does not provide enough data for the communication, PGW 120 may transfer subsequent quota requests to gather subsequent data quotas until the communication is complete or the wireless communication device has liquidated the available data in OCS 110.

Figure 3:
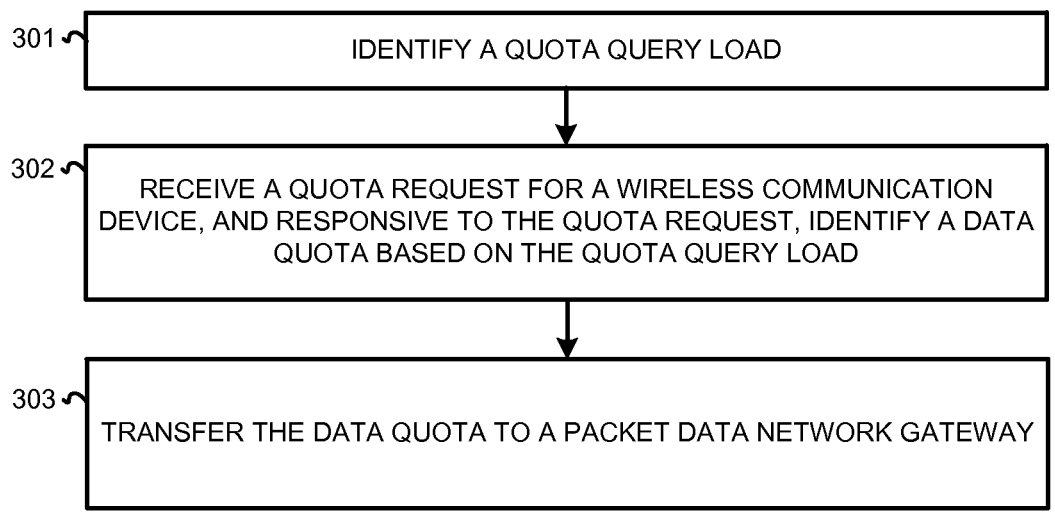
FIG. 3 illustrates a flow chart for operating an online charging server to provide data quotas.

To further illustrate the operation of OCS 110, FIG. 3 is included. FIG. 3 illustrates a method of operating an online charging server to provide data quotas based on a quota query load. In operation, packet data network gateways are configured to communicate with an online charging server to retrieve data quotas for wireless devices. These data quotas comprise portions or segments of the total data available to each of the devices, and allow the devices to communicate for certain allotted periods of time.

In the present example, OCS 110 is configured to identify a quota query load (301) based on the number of quota requests received over a period or segment of time. OCS 110 is further configured to receive a quota request for a wireless communication device from PGW 120, and responsive to the request, identify a data quota based on the quota query load (302). In some instances, OCS 110 may identify that it has received a large quantity of quota requests over a recent period of time. Accordingly, OCS 110 may adjust the data quota provided for the wireless communication device to ensure that any subsequent quota requests are more spread out decreasing the load on OCS 110. To adjust the data quota, OCS 110 may increase the amount of data provided in the data quota, increase the amount of time that the device has to use the data provided in the quota, or some other similar modification—including combinations thereof.

In contrast, OCS 110 may also identify a smaller quota query load when OCS 110 receives a smaller number of quota requests over a recent period or segment of time. Based on the smaller quota query load, OCS 110 may adjust the data quota provided for the wireless communication device to increase the rate at which PGW 120 may transfer quota requests. To adjust the data quota provided, OCS 110 may decrease the amount of data provided in the data quota, decrease the amount of time that the device has to use the data provided in the quota, or some other similar modification—including combinations thereof.

Figure 4:
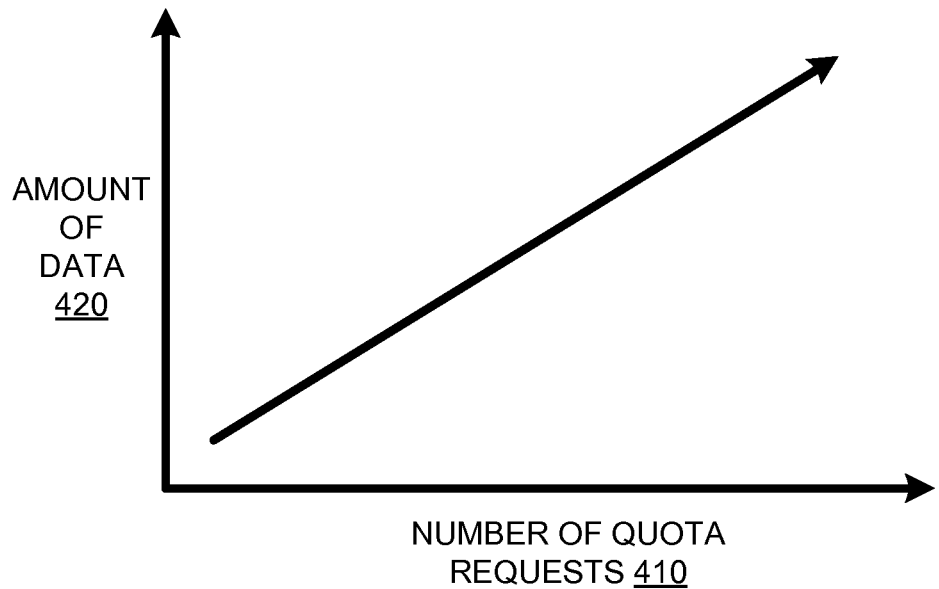
FIG. 4 illustrates a chart for adjusting data quotas based on a quota query load.
Figure 5:
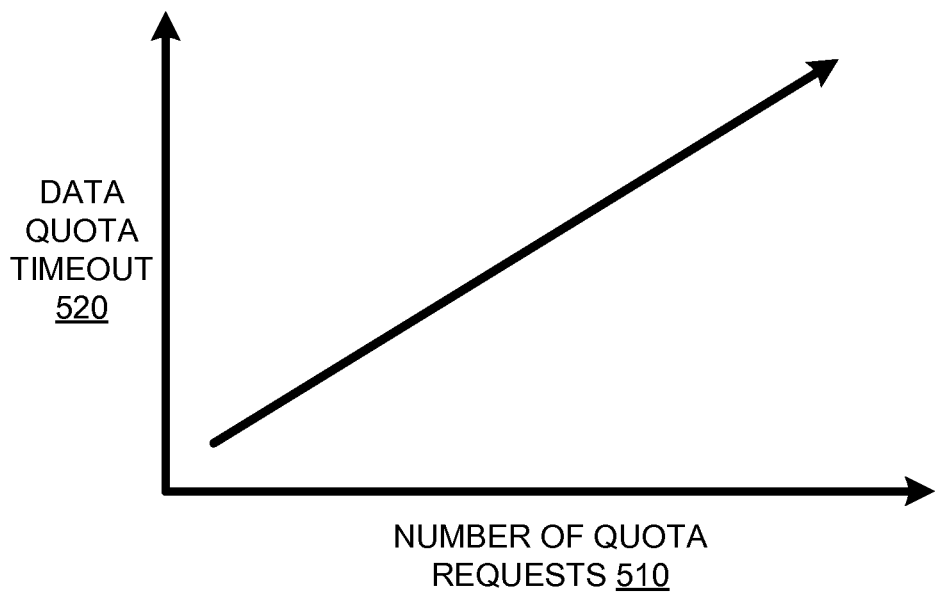
FIG. 5 illustrates a chart for adjusting data quota timeout based on a quota query load.

In some examples, as further illustrated in FIGS. 4 and 5, the amount of data provided or the amount of time provided for each data quota may be proportional to the quota query load. This proportionality may be linear, tiered, exponential, or any other proportionality that allows for modifying the time between quota requests. For example, by providing a larger amount of data in a data quota, the device will take longer to exhaust the resources provided by OCS 110. Similarly, if a longer time period is provided for using the data quota, PGW 120 may require fewer requests to OCS 110. Once the data quota is identified for the wireless device, OCS 110 may transfer the data quota to the packet data network gateway responsible for the quota request (303).

Turning to FIGS. 4 and 5, FIGS. 4 and 5 illustrate charts for adjusting data quotas based on quota query load. As discussed previously, data quotas are provided by an online charging server to packet data network gateways to allow a device to communicate over a wireless network. These data quotas include a segment or portion of total data available to the wireless device, as well as a time period that the quota must be consumed.

As illustrated in FIG. 4, the online charging server may adjust the amount of data 420 provided in a data quota based on the number of quota requests 410 received by the online charging server over a segment of time. The online charging server may identify this number of quota requests 410 over a period of time as a quota query load. As depicted, amount of data 420 is configured to increase as the number of quota requests 410 increases. Accordingly, by providing a larger amount of data when busy, the packet data network gateway may require fewer quota requests to the online charging server. Although illustrated as a linear relationship in the present instance, it should be understood that the relationship between quota amount 420 and number of quota requests 410 may be exponential, step functioned, or any other proportionality.

Similar to FIG. 4, FIG. 5 illustrates increasing data quota timeout 520 or the period of time to use a data quota based on the number of data quota requests 510 to the online charging server. By providing a larger amount of time for a device to use a data quota, the packet data network gateways may require fewer quota requests for a wireless device. Although illustrated as a linear relationship in the present instance, it should be understood that the relationship between data quota timeout 520 and number of quota requests 510 may be exponential, step functioned, or any other proportionality. Further, although illustrated separately in the examples for FIGS. 4 and 5 it should be understood that an online charging server might adjust the data quotas using both the amount of data provided and the amount of time to use the quota.

Figure 6:
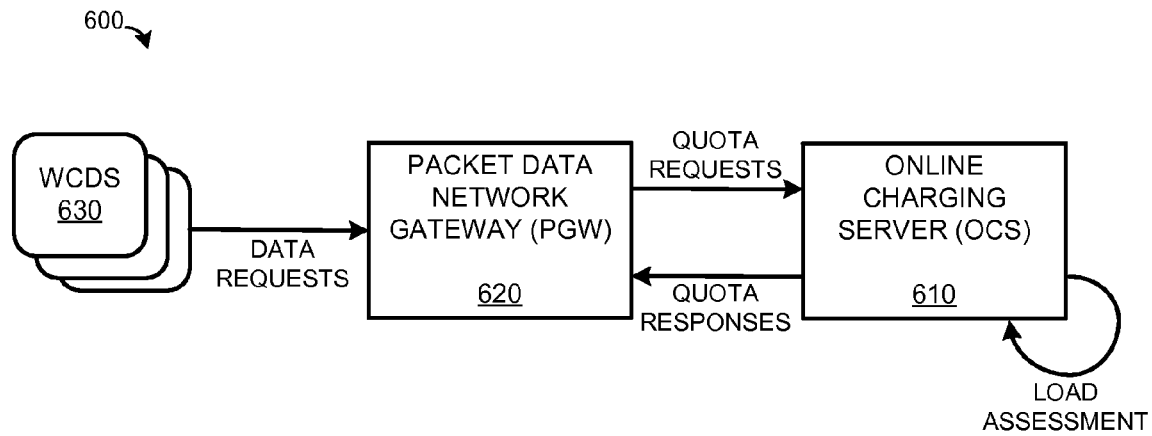
FIG. 6 illustrates an overview of operating a communication system to provide data quotas based on a quota query load.

Referring now to FIG. 6, FIG. 6 illustrates an overview 600 for implementing dynamic data quotas based on quota query loads. Overview 600 includes online charging server (OCS) 610, packet data network gateway (PGW) 620, and wireless communication devices (WCDs) 630. In operation, WCDs 630 may include applications and other processes that request data communications across a communication network. Responsive to these requests, PGW 620 is configured to determine whether WCDs 630 have permission to communicate across the network. To accomplish this task, PGW 620 transfers quota requests for delivery to OCS 610. In response to the quota requests, OCS 610 identifies a data quota for each of the wireless devices, and returns the data quotas to PGW 620 to be implemented. Once a device has used the allotted quota, PGW 620 may request supplementary quotas until either the communication is complete or the device has exhausted the allotted total data.

In the present example, OCS 610 is configured to base the data quotas at least partially on a quota query load or the amount of quota requests that are received by OCS 610 over a segment of time. As a result, the portion or amount of the total data identified for each of the data quotas may increase when the query load assessment is high, and may decrease when the query load assessment is low. In addition to or in place of changing the data quota amounts, OCS 610 may adjust the amount of time provided for each of the data quotas to be consumed (data quota timeout). Accordingly, as the quota query load increases the data quota timeout may also increase, and when the quota query load decreases the data quota timeout may also decrease.

Figure 7:
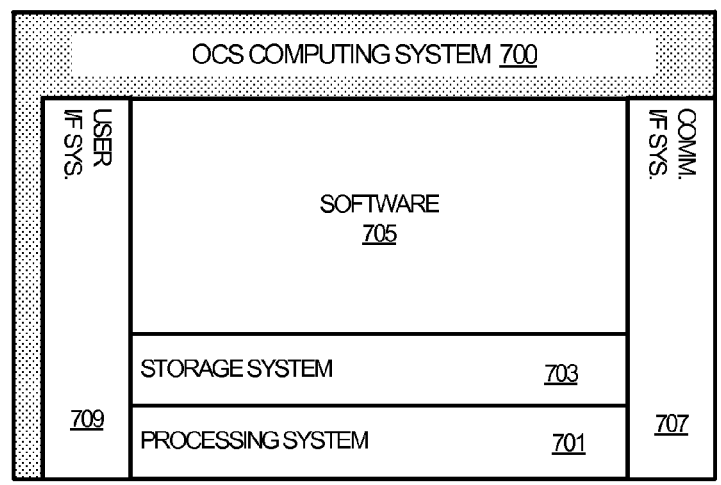
FIG. 7 illustrates an online charging server computing system for providing data quotas based on quota query load.

FIG. 7 illustrates an online charging server (OCS) computing system 700 for identifying and returning data quotas for wireless communication devices. OCS computing system 700 is representative of a computing system that may be employed in any computing apparatus, system, or device, or collections thereof, to suitably implement OCS 110 and OCS 610. Computing system 700 may be employed in server computers, desktop computers, or any other similar computing device.

Computing system 700 includes processing system 701, storage system 703, software 705, communication interface system 707, and user interface system 709. Processing system 701 is operatively coupled with storage system 703, communication interface system 707, and user interface system 709. Processing system 701 loads and executes software 705 from storage system 703. When executed by processing system 701, software 705 directs processing system 701 to operate as described herein as an online charging server to identify and return data quotas based on a quota query load. Computing system 700 may optionally include additional devices, features, or functionality not discussed here for purposes of brevity.

Referring still to FIG. 7, processing system 701 may comprise a microprocessor and other circuitry that retrieves and executes software 705 from storage system 703. Processing system 701 may be implemented within a single processing device, but may also be distributed across multiple processing devices or sub-systems that cooperate in executing program instructions. Examples of processing system 701 include general-purpose central processing units, application specific processors, and logic devices, as well as any other type of processing device, combinations, or variation.

Storage system 703 may comprise any computer readable storage media readable by processing system 701 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 703 may also include communication media over which software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 701 or possibly other systems.

Software 705 may be implemented in program instructions and among other functions may, when executed by processing system 701, direct processing system 701 to operate as an online charging server described herein by FIGS. 1-6. In particular, the program instructions may include various components or modules that cooperate or otherwise interact to carry out the data quota operations described in FIGS. 1-6. The various components or modules may be embodied in compiled or interpreted instructions, or in some other variation or combination of instructions. The various components or modules may be executed in a synchronous or asynchronous manner, in a serial or in parallel, in a single threaded environment or multi-threaded environment, or in accordance with any other suitable execution paradigm, variation, or combination thereof. Software 705 may include additional processes, programs, or components, such as operating system software, hypervisor software, or other application software. Software 705 may also comprise firmware or some other form of machine-readable processing instructions executable by processing system 701.

For example, if the computer-storage media are implemented as semiconductor-based memory, software 705 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 700 is generally intended to represent a system on which software 705 may be deployed and executed in order to implement an online charging server from FIGS. 1-6 (or variations thereof). However, computing system 700 may also be suitable for any computing system on which software 705 may be staged and from where software 705 may be distributed, transported, downloaded, or otherwise provided to yet another computing system for deployment and execution, or yet additional distribution.

In one example, computing system 700 is configured to make a quota query load assessment based on the number of quota requests received using communication interface system 707 over a period of time. This quota query load assessment allows computing system 700 to adjust the data quotas provided in response quota requests. For instance, a packet data network gateway may transfer a quota request for a wireless communication device to computing system 700. In response to this request, software 705 on computing system 700 is configured to identify a data quota for the device based at least in part on the quota query load. For instance, if the quota query load were high, computing system 700 may identify a larger amount of data for the data quota, or grant a greater timeout period for the device to use the provided data quota. Similarly, if the quota query load were low, computing system 700 may identify a smaller amount of data for the data quota, or grant a smaller timeout period for the device to use the provided data quota. Once the data quota is determined, computing system 700 is configured to transfer the data quota to the packet data network gateway to be implemented.

In some examples, one data quota is not enough to complete a communication for a wireless device. Accordingly, the packet data network gateway may make subsequent quota requests to provide the data sufficient to make the required communication. Further, computing system 700 may continually monitor the quota query load and adjust the load based on the current state of the requests. Thus, the first data quota supplied for a device may be different than the second data quota for the device.

Referring still to FIG. 7, communication interface system 707 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface system 709, which may be omitted in some examples, may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here. User interface system 709 may also include associated user interface software executable by processing system 701 in support of the various user input and output devices discussed above. Separately, or in conjunction with each other and other hardware and software elements, the user interface software and devices may support a graphical user interface, a natural user interface, or any other suitable type of user interface.

Returning to FIG. 1, online charging server (OCS) 110 may comprise any computing system with the ability to identify data quotas based on a quota query load. OCS 110 may include processing systems, user interfaces, communication interfaces, storage systems, or other similar computing elements.

PGW 120 may comprise any computing devices capable of acting as a gateway between the wireless network and the other packet data networks, such as the Internet or SIP-based IMS networks. PGW 120 may include processing systems, user interfaces, communication interfaces, storage systems, or other similar computing elements. In particular, PGW 120 may include elements to request, receive, and implement data quotas for connecting wireless communication devices.

Wireless communication devices (WCDs) 150-154 each comprise Radio Frequency (RF) communication circuitry and an antenna. The RF communication circuitry typically includes an amplifier, filter, modulator, and signal processing circuitry. Wireless communication devices 150-154 may also include a user interface, memory device, software, processing circuitry, or some other communication components. Each of wireless communication devices 150-154 may be a telephone, computer, e-book, mobile Internet appliance, wireless network interface card, media player, game console, or some other wireless communication apparatus—including combinations thereof.

Wireless network 130 comprises network elements that provide communication services to WCDs 150-154. Wireless network 130 may comprise switches, wireless access nodes, Internet routers, network gateways, application servers, computer systems, communication links, or some other type of communication equipment—including combinations thereof.

Wireless sector 162 includes wireless links that use the air or space as the transport media. The wireless links may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 160-161 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 160-161 could be direct links or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to provide dynamic data quotas for wireless communication devices, the method comprising:
    in a packet data network gateway, identifying a communication request for a wireless communication device and, responsive to the communication request, transferring a quota request for the wireless communication device to an online charging server;
    in the online charging server, in response to receiving the quota request, identifying a data quota size for a data quota to be supplied for the wireless communication device based on a quota query load, wherein the quota query load comprises a number of quota requests received from at least one packet data network gateway by the online charging server over a period of time, and transferring the data quota to the packet data network gateway; and
    in the packet data network gateway, receiving the data quota for the wireless communication device.

2. The method of claim 1 wherein the data quota comprises a portion of total data available to the wireless communication device for a time period.

3. The method of claim 1 wherein identifying the data quota size for the data quota to be supplied for the wireless communication device based on the quota query load comprises identifying the data quota size for the data quota to be supplied for the wireless communication device in proportion to the quota query load.

4. The method of claim 3 further comprising identifying an availability time period for the data quota in proportion to the quota query load.

5. The method of claim 1 further comprising:
    in the packet data network gateway and responsive to exhausting the data quota, transferring a subsequent quota request for the wireless communication device to the online charging server;
    in the online charging server, receiving the subsequent quota request, identifying a second data quota size for a subsequent data quota to be supplied for the wireless communication device based on the quota query load, and transferring the subsequent data quota to the packet data network gateway; and
    in the packet data network gateway, receiving the subsequent data quota for the wireless communication device.

6. The method of claim 5 wherein the data quota and the subsequent data quota comprise different data quotas.

7. The method of claim 1 further comprising, in the online charging server, identifying an availability time period for the data quota based on the quota query load.

8. A system for providing dynamic data quotas, the system comprising:
    a packet data network gateway configured to:
        identify a communication request for a wireless communication device;
        responsive to the communication request, transfer a quota request for the wireless communication device to an online charging server; and
        receive a data quota for the wireless communication device from the online charging server; and
    the online charging server configured to:
        receive the quota request;
        in response to receiving the quota request, identify a data quota size for the data quota to be supplied for the wireless communication device based on a quota query load, wherein the quota query load comprises a number of quota requests received from at least one packet data network gateway by the online charging server over a segment of time; and
        transfer the data quota to the packet data network gateway.

9. The system of claim 8 wherein the data quota comprises a portion of total data available to the wireless communication device for a time period.

10. The system of claim 9 wherein the online charging server configured to identify the data quota size for the data quota to be supplied for the wireless communication device based on the quota query load is configured to identify the data quota size for the data quota to be supplied for the wireless communication device in proportion to the quota query load.

11. The system of claim 10 wherein the online charging server is further configured to identify an availability time period for the data quota in proportion to the quota query load.

12. The system of claim 8 wherein the packet data network gateway configured to transfer the quota request for the wireless communication device to the online charging server is configured to transfer the quota request for the wireless communication device to the online charging server using a Gy interface.

13. The system of claim 8 wherein the online charging server is further configured to identify an availability time period for the data quota based on the quota query load.

14. A method of operating an online charging server to provide dynamic data quotas comprising:
   identifying a quota query load, wherein the quota query load comprises a number of quota requests received from at least one packet data network gateway by the online charging server over a segment of time;
   for a given quota request received from a packet data network gateway to support a communication for a wireless communication device, identifying a data quota size for a data quota to be supplied for the communication based on the quota query load; and
   transferring the data quota to the packet data network gateway.

15. The method of claim 14 wherein the data quota comprises a portion of total data available to a wireless communication device for a period of time.

16. The method of claim 14 wherein identifying the data quota size for the data quota to be supplied for the communication based on the quota query load comprises identifying the data quota size for the data quota to be supplied for the communication in proportion to the quota query load.

17. The method of claim 16 further comprising:
   identifying an availability time period for the data quota in proportion to the quota query load.

18. The method of claim 14 further comprising:
   for a second quota request received from the packet data network gateway to support a second communication for a second wireless communication device, identifying a second data quota size for a second data quota to be supplied for the second communication based on the quota query load; and
   transferring the second data quota to the packet data network gateway.

19. The method of claim 14 further comprising identifying an availability time period for the data quota based on the quota query load.

* * * * *